United States Patent
Choi et al.

(10) Patent No.: US 9,373,868 B2
(45) Date of Patent: Jun. 21, 2016

(54) COMPOSITE CATHODE ACTIVE MATERIAL, METHOD OF PREPARING THE SAME, AND CATHODE AND LITHIUM BATTERY CONTAINING THE SAME

(71) Applicant: Samsung Electronics Co., Ltd., Suwon-si, Gyeonggi-do (KR)

(72) Inventors: Byung-jin Choi, Seoul (KR); Yoon-sok Kang, Seongnam-si (KR); Jin-hwan Park, Seoul (KR); Jae-gu Yoon, Suwon-si (KR); Myung-hoon Kim, Seoul (KR); Jun-young Mun, Seoul (KR); Jun-ho Park, Seoul (KR); Sung-jin Ahn, Anyang-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/485,964

(22) Filed: Sep. 15, 2014

(65) Prior Publication Data

US 2015/0079465 A1 Mar. 19, 2015

(30) Foreign Application Priority Data

Sep. 16, 2013 (KR) .......................... 10-2013-0111186

(51) Int. Cl.

| | |
|---|---|
| *H01M 6/04* | (2006.01) |
| *H01M 10/0568* | (2010.01) |
| *H01M 10/052* | (2010.01) |
| *H01M 4/36* | (2006.01) |
| *H01M 4/505* | (2010.01) |
| *H01M 4/525* | (2010.01) |
| *H01M 4/58* | (2010.01) |
| *C01G 45/12* | (2006.01) |
| *C01G 53/00* | (2006.01) |
| *H01M 4/485* | (2010.01) |

(52) U.S. Cl.
CPC ....... *H01M 10/0568* (2013.01); *C01G 45/1242* (2013.01); *C01G 45/1257* (2013.01); *C01G 53/006* (2013.01); *C01G 53/50* (2013.01); *H01M 4/364* (2013.01); *H01M 4/505* (2013.01); *H01M 4/525* (2013.01); *H01M 4/5825* (2013.01); *H01M 10/052* (2013.01); *C01P 2002/50* (2013.01); *C01P 2002/54* (2013.01); *C01P 2004/82* (2013.01); *H01M 4/485* (2013.01); *H01M 2300/0037* (2013.01); *Y02E 60/122* (2013.01); *Y02T 10/7011* (2013.01)

(58) Field of Classification Search
CPC .............................. H01M 4/505; H01M 4/405
See application file for complete search history.

(56) References Cited

U.S. PATENT DOCUMENTS

| | | | |
|---|---|---|---|
| 8,080,340 B2 | 12/2011 | Thackeray et al. | |
| 2004/0229124 A1* | 11/2004 | Miyamoto | ........ H01M 10/0525 429/231.1 |
| 2010/0248033 A1 | 9/2010 | Kumar et al. | |
| 2011/0076564 A1 | 3/2011 | Yu et al. | |

FOREIGN PATENT DOCUMENTS

| | | |
|---|---|---|
| KR | 10-0943193 B1 | 2/2010 |
| KR | 10-1190185 B1 | 10/2012 |

* cited by examiner

*Primary Examiner* — Jane Rhee
(74) *Attorney, Agent, or Firm* — Cantor Colburn LLP

(57) ABSTRACT

A composite cathode active material including a lithium metal oxide including an oxide Formula 1 and sulfur, $$xLi_2MnO_3 \cdot (1-x-y)LiMO_2 \cdot yLiMn_2O_4 \quad (1)$$

wherein $0<x<0.6$, $0<y<0.1$, and M is at least one selected from a metal and a metalloid.

20 Claims, 4 Drawing Sheets

COMPOSITE CATHODE ACTIVE MATERIAL, METHOD OF PREPARING THE SAME, AND CATHODE AND LITHIUM BATTERY CONTAINING THE SAME

RELATED APPLICATIONS

This application claims priority to Korean Patent Application No. 10-2013-0111186, filed on Sep. 16, 2013, in the Korean Intellectual Property Office, and all the benefits accruing therefrom under 35 U.S.C. §119, the content of which is incorporated herein in its entirety by reference.

BACKGROUND

1. Field

The present disclosure relates to a composite cathode active material, a method of manufacturing the composite cathode active material, and a cathode and a lithium secondary battery including the composite cathode active material.

2. Description of the Related Art

To manufacture high performance miniaturized devices, high energy density and high performance miniaturized lithium secondary batteries are desired. Batteries which provide high voltage and high capacity are desirable. Accordingly, there remains a need for a cathode active material having excellent high rate characteristics and lifetime characteristics, and a lithium secondary battery including the same.

SUMMARY

Provided is a composite cathode active material for a lithium secondary battery having excellent high rate characteristics and improved lifetime characteristics under high voltage conditions.

Also provided is a cathode including the composite cathode active material.

Provided further is a lithium secondary battery including the cathode.

Additional aspects will be set forth in part in the description which follows and, in part, will be apparent from the description.

In an aspect, there is provided a composite cathode active material including a lithium metal oxide including an oxide of Formula 1 and sulfur, $$x\text{Li}_2\text{MnO}_3 \cdot (1-x-y)\text{LiMO}_2 \cdot y\text{LiMn}_2\text{O}_4 \quad (1)$$

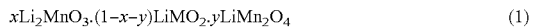

wherein $0<x<0.6$, $0<y<0.1$, and M is at least one selected from a metal and a metalloid.

In an embodiment, $0<y<0.05$, or $0.3<x<0.6$ and $0.01<y<0.05$.

The molar ratio between oxygen and sulfur included in the lithium metal oxide can be $O:S=2-\beta:\beta$, wherein $0<\beta<0.1$.

The sulfur can partially replace oxygen in the lithium metal oxide.

In Formula 1, M can be at least one selected from Mn, V, Cr, Fe, Co, Ni, Zr, Re, Al, B, Ge, Ru, Sn, Ti, Nb, Mo, and Pt.

In Formula 1, M may include all of Co, Ni, and Mn.

In an embodiment, there is provided a composite cathode active material including a lithium metal oxide including an oxide of Formula 2 and sulfur, $$x'\text{Li}_2\text{MnO}_3 \cdot (1-x'-y')\text{Li}[\text{Ni}_a\text{Co}_b\text{Mn}_c]\text{O}_2 \cdot y'\text{LiMn}_2\text{O}_4 \quad (2)$$

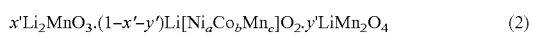

wherein $0.4<x'<0.6$, $0.01<y'<0.05$, and $a+b+c=1$, and wherein a molar ratio between oxygen and sulfur included in the lithium metal oxide is $O:S=2-\beta:\beta$, wherein $0<\beta<0.1$.

In another aspect, there is provided a cathode including the composite cathode active material.

In a further aspect, there is provided a lithium secondary battery including a cathode including a lithium metal oxide including an oxide of Formula 1 and sulfur, $$x\text{Li}_2\text{MnO}_3 \cdot (1-x-y)\text{LiMO}_2 \cdot y\text{LiMn}_2\text{O}_4 \quad (1)$$

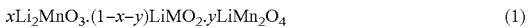

wherein $0<x<0.6$ and $0<y<0.1$; an anode including an anode active material capable of insertion and desertion of lithium, and an electrolyte between the cathode and the anode, the electrolyte including a lithium salt and a non-aqueous organic solvent.

Also disclosed is a method of manufacturing the composite cathode active material, the method including: combining manganese sulfate and a sulfate of a metal or a metalloid to form a mixture; dissolving the mixture in water to form a solution; contacting the solution with a precipitator to form a precipitate; adding lithium carbonate to the precipitate to form a second mixture; and heat treating the second mixture to manufacture the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
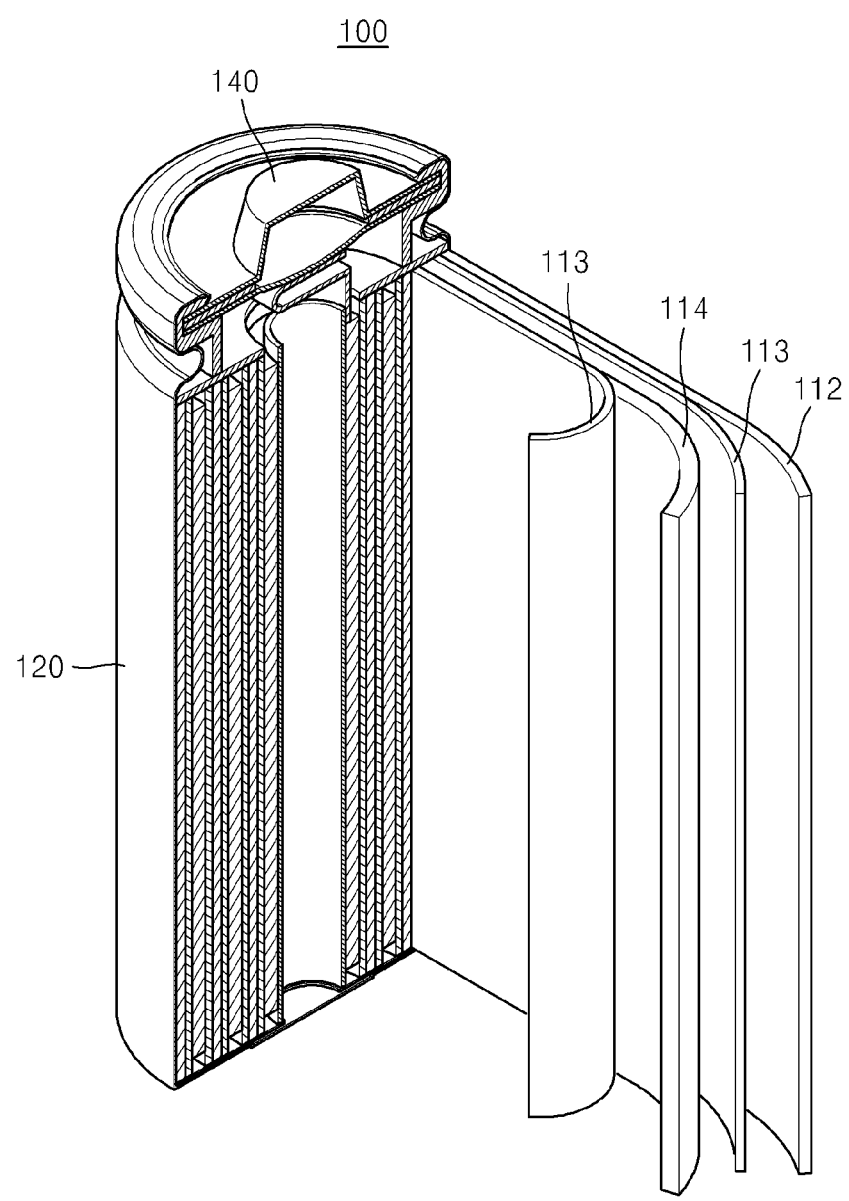
FIG. 1 shows an exploded perspective view of an embodiment of a lithium secondary battery.
Figure 2:
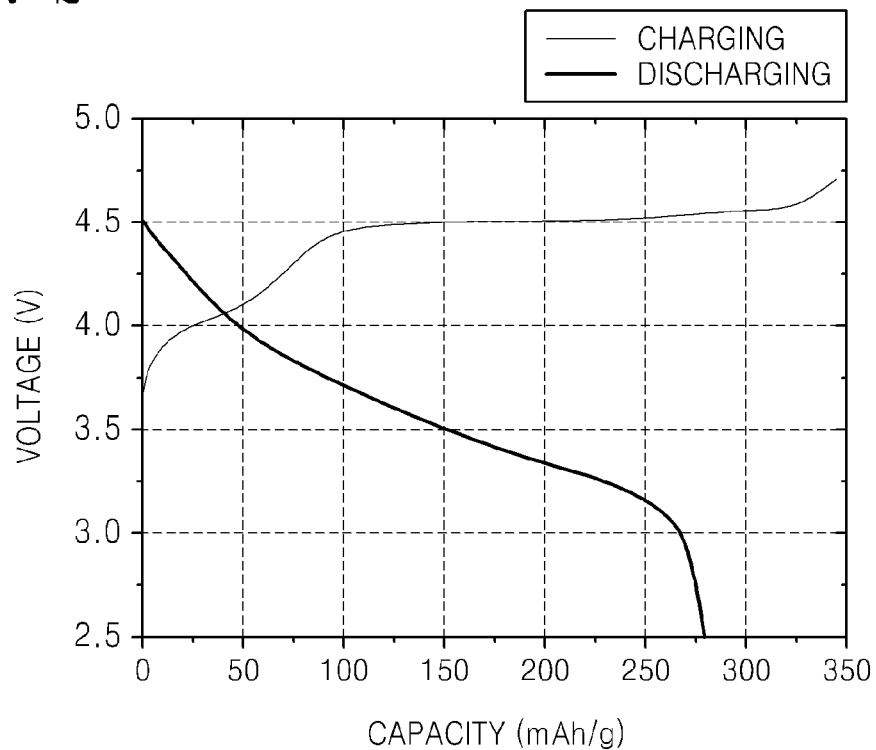
FIG. 2 is a graph of voltage (Volts, V) versus capacity (milliampere-hours per gram) illustrating a first charge and discharge of a lithium secondary battery according to the Comparative Example.
Figure 3:
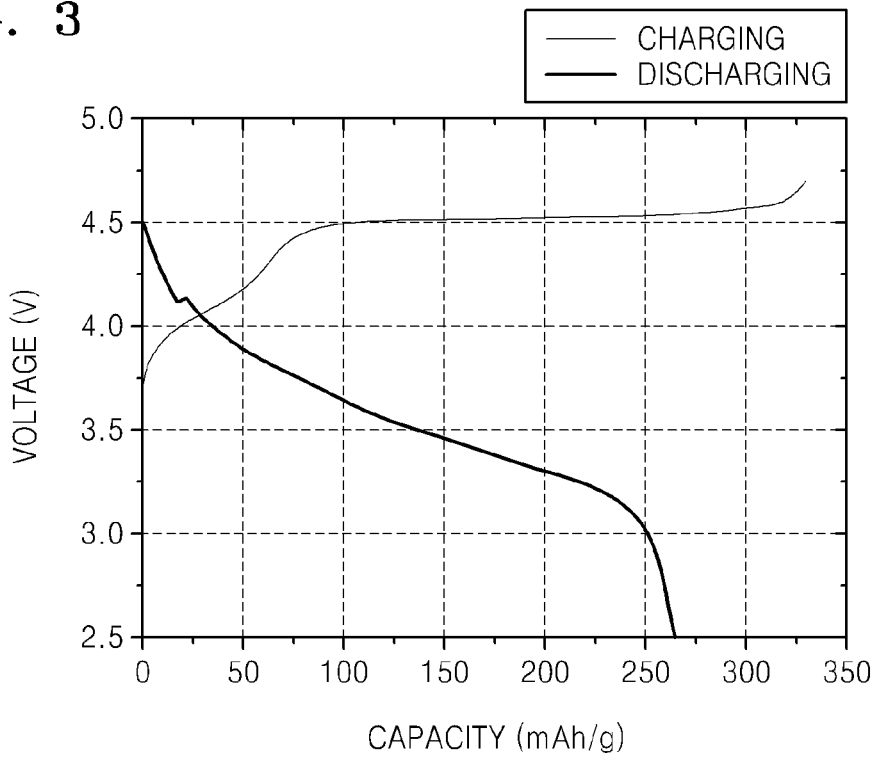
FIG. 3 is a graph of voltage (Volts, V) versus capacity (milliampere-hours per gram) illustrating a first charge and discharge of a lithium secondary battery according to Example 1.
Figure 4:
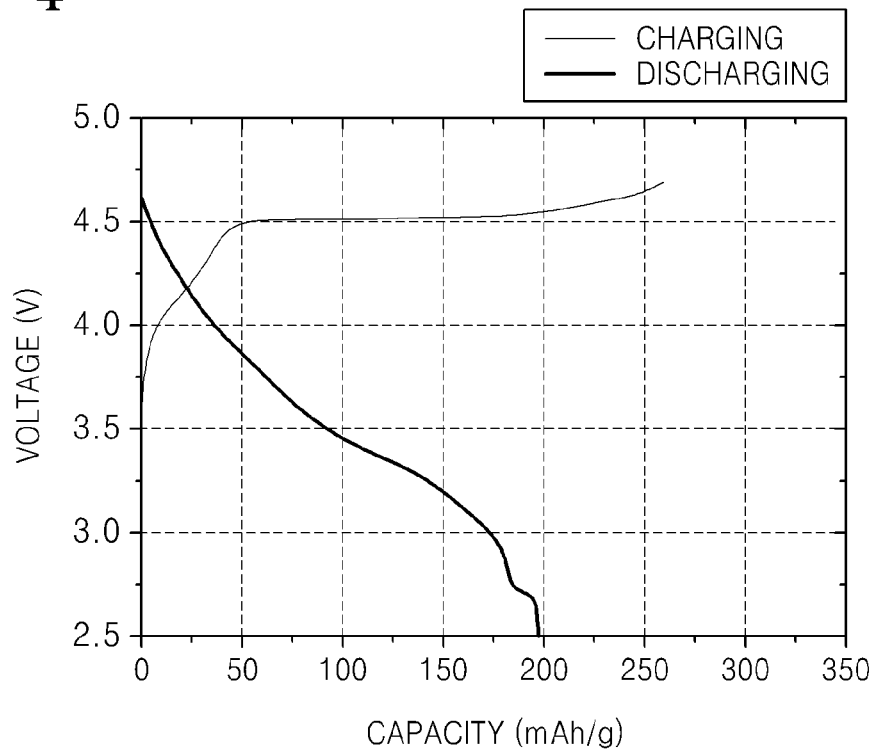
FIG. 4 is a graph of voltage (Volts, V) versus capacity (milliampere-hours per gram) illustrating a first charge and discharge of a lithium secondary battery according to Example 2.
Figure 5:
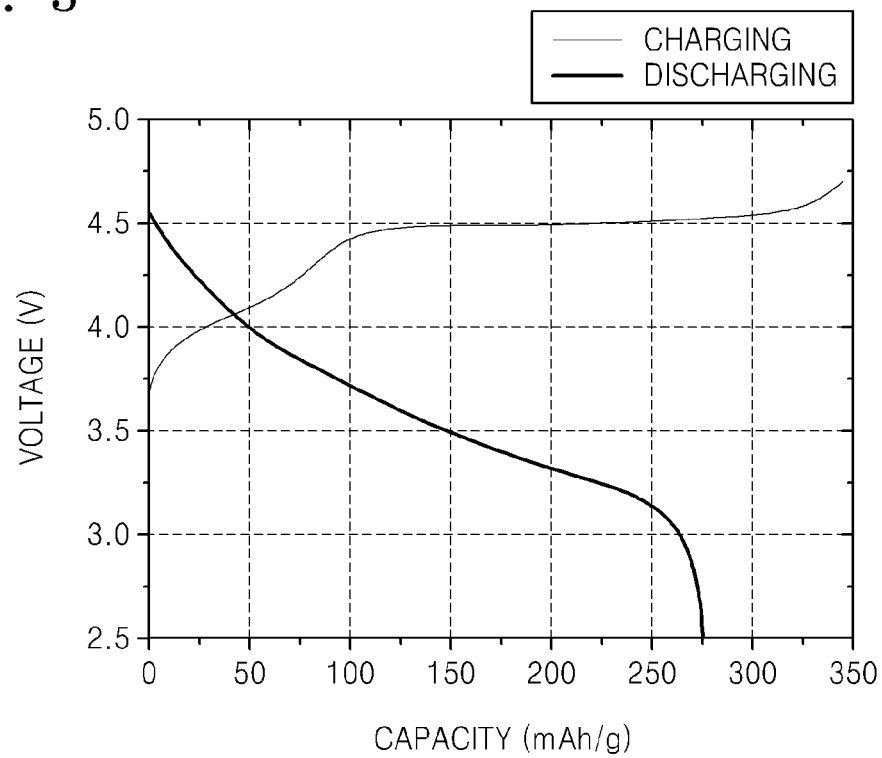
FIG. 5 is a graph of voltage (Volts, V) versus capacity (milliampere-hours per gram) illustrating a first charge and discharge of a lithium secondary battery according to Example 3.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Charge and discharge rates are disclosed herein using C rates. A C rate means a current which will discharge a battery in one hour, e.g., a C rate for a battery having a discharge capacity of 1.6 ampere-hours would be 1.6 amperes.

Disclosed is a composite cathode active material, a cathode including the composite cathode active material, and a lithium secondary battery including the cathode. The composite cathode active material includes a layered-spinel structure doped with sulfur, and provides a lithium secondary battery having improved high rate capability and lifetime characteristics.

According to an embodiment, the composite cathode active material includes a lithium metal oxide comprising an oxide of Formula 1, wherein the lithium metal oxide comprises, e.g., is doped with, sulfur:

$$xLi_2MnO_3 \cdot (1-x-y)LiMO_2 \cdot yLiMn_2O_4 \quad (1)$$

wherein $0<x<0.6$ and $0<y<0.1$. The sulfur may be included by any suitable method, and can be included by doping the oxide with sulfur, for example.

M is at least one selected from a metal and a metalloid, and can be at least one selected from Mn, V, Cr, Fe, Co, Ni, Zr, Re, Al, B, Ge, Ru, Sn, Ti, Nb, Mo, and Pt, and may be a divalent, trivalent, quadravalent, pentavalent, or hexavalent positive ion. M may include a plurality of metals, for example, all of Co, Ni, and Mn. In an embodiment, M is Co, Ni, and Mn.

The composite cathode active material includes the lithium metal oxides $Li_2MnO_3$, $LiMO_2$, and $LiMn_2O_4$. The $Li_2MnO_3$ and $LiMO_2$ may each have a layered structure, and the $LiMn_2O_4$ may have a spinel structure.

While not wanting to be bound by theory, it is understood that introduction of $LiMn_2O_4$ with a spinel structure into a layered composite of $Li_2MnO_3$ and $LiMO_2$ results in a cathode active material having improved structural stability. The composite cathode active material having improved structural stability may improve the structural stability of a lithium secondary battery during charging and discharging thereof.

A $LiMO_2$ lithium transition metal oxide with a layered structure may have denser crystalline structure than $Li_2MnO_3$ or $LiMn_2O_4$ because of ionic bonding in the $LiMO_2$ crystal structure. While not wanting to be bound by theory, it is understood that a dense layer is formed by oxygen ions having a larger ionic radius, and lithium ions and transition metal ions are arranged into an empty space between oxygen ions to thereby increase the packing density of the structure. In particular, a transition metal oxide layer consisting of a transition metal and oxygen and an oxygen octahedral layer which encompasses lithium ions are arranged in an alternative fashion. Due to a strong ionic bond formed within an $MO_2$ layer and a coulombic repulsive force generated between $MO_2$ layers, intercalation/deintercalation of lithium ions is achieved, and the lithium ions diffuse along a two-dimensional plane, thereby having high ion conductivity.

However, as the lithium ions deintercalate during the charging process, the crystal structure of $LiMO_2$ expands in a c-axis direction due to the repulsive forces among oxygen atoms in the $MO_2$ layer, and when the lithium ions deintercalate completely, the crystal structure of $LiMO_2$ may rapidly shrink in the c-axis direction, which may lead to various phase changes.

Additionally, the composite of $Li_2MnO_3$ and $LiMO_2$ provides desirable properties as a high capacity cathode active material. While not wanting to be bound by theory, it is understood that on the initial charge, up to 4.4V, the composite forms a phase of the formula $uLi_2MnO_3 \cdot (1-u)MO_2$ by deintercalation of the lithium from $LiMO_2$, whereas, at 4.4V or higher, a phase of the formula $(u-\delta)Li_2MnO_3 \cdot \delta MnO_2 \cdot (1-u)M_2O_4$ is formed along with $Li_2O$. That is, at 4.4V or higher, Li$_2$O is formed due to oxygen generation concurrently with the deintercalation of the lithium from Li$_2$MnO$_3$. Also, MnO$_2$ is formed. The process may be indicated as shown in Reaction 1.

$$\text{Li}_2\text{MnO}_3 \rightarrow u\text{Li}_2\text{O} + u\text{MnO}_2 + (1-u)\text{Li}_2\text{MnO}_3 \tag{1}$$

As shown in Reaction 1, Li$_2$MnO$_3$ undergoes a phase transition on the initial charge, unlike layered LiMO$_2$, which shows a guest-host reaction. The amount of remaining Li$_2$MnO$_3$ can be determined according to the cut-off voltage during charge, and thus, the amount of remaining Li$_2$MnO$_3$ is understood to decrease when the cut-off voltage is increased to provide higher capacity. That is, the increase in the cut-off voltage results in a decrease in the amount of remaining Li$_2$MnO$_3$, thereby destabilizing the composite structure.

The discharge reaction, which is the reverse of Reaction 1, may be qualitatively indicated as Reaction 2.

$$\text{Li} + \text{MnO}_2 \rightarrow \text{LiMnO}_2 \tag{2}$$

Regarding the initial charge/discharge reaction, it was confirmed that 2 mole equivalents of lithium are deintercalated per 1 mole equivalent of Mn, and then 1 mole equivalent of lithium is returned. The above characteristics may result in low charge/discharge efficiency, and also the phase transition may deteriorate the lifetime characteristics of the battery. Accordingly, a cathode active material having a more stable structure under high voltage conditions is desired.

LiMn$_2$O$_4$ has a spinel structure of the cubic system. In the spinel structure, all of the transition metal ions of the layered or spinel cathode active material occupy octahedral sites.

In the layered structure, 6 MO$_6$ units are arranged in a two-dimensional fashion around one MO$_6$ unit, whereas in the spinel structure, 6 MO$_6$ units are arranged in a three-dimensional fashion around one MO$_6$ unit. While not wanting to be bound by theory, it is understood that this difference is due to the difference in the oxidation number of transition metal. The spinel compound is configured such that its plane-sharing octahedra are connected in a three-dimensional fashion and thus provide a channel for the passage of the lithium ions during the charge/discharge process.

LiMn$_2$O$_4$ is desirable because the cost of LiMn$_2$O$_4$ is relatively low due to the abundance of Mn reserves. Additionally, LiMn$_2$O$_4$ has low toxicity, MO$_2$ is maintained and hardly releases heat even when all the lithium ions are reduced (i.e., at a charged state), and also has an excellent cycle performance in a 4V region although it is less than that of LiMO$_2$. However, LiMn$_2$O$_4$ has relatively low density and its capacity decreases with a temperature change.

When LiMn$_2$O$_4$ having a spinel structure is introduced into a composite comprising, or consisting of, Li$_2$MnO$_3$ and LiMO$_2$ having a layered structure, the inclusion of the LiMn$_2$O$_4$ can improve the stability of a cathode structure during high voltage charging, thereby improving the lifetime characteristics and voltage characteristics of the composite.

A molar content of Li$_2$MnO$_3$ and LiMn$_2$O$_4$ in the composite oxide of Formula 1 can be 0<x<0.6 and 0<y<0.1, more specifically 0<x<0.6 and 0<y<0.05, or 0.3<x<0.6 and 0.01<y<0.05. In an embodiment, 0.1<x<0.5, or 0.15<x<0.45, or 0.2<x<0.4. Also, y can be 0.01<y<0.09, or 0.02<y<0.08, or 0.03<y<0.07.

In addition, and while not wanting to be bound by theory, it is understood that the oxygen lattice structure in the composite cathode active material may be stabilized by partially replacing the oxygen by doping the composite cathode active material with sulfur. The sulfur content can be such that the molar ratio between oxygen and sulfur included in the lithium metal oxide is O:S=2−β:β, wherein 0<β<0.1. In an embodiment, 0.01<β<0.09, or 0.02<β<0.08, or 0.03<β<0.07. When the amount of sulfur is 0<β<0.1, the structure of an oxygen lattice can be stabilized.

More specifically, the composite cathode active material may include a lithium metal oxide comprising an oxide of Formula 2, wherein the lithium metal oxide comprises, e.g., is doped with, sulfur.

$$x'\text{Li}_2\text{MnO}_3 \cdot (1-x'-y')\text{Li}[\text{Ni}_a\text{Co}_b\text{Mn}_c]\text{O}_2 \cdot y'\text{LiMn}_2\text{O}_4 \tag{2}$$

In Formula 2, 0.4<x'<0.6, 0.01<y'<0.05, and a+b+c=1. Li[Ni$_a$Co$_b$Mn$_c$]O$_2$, a ternary system, exhibits excellent electrochemical properties by combining the high capacity of LiNiO$_2$, thermal stability and low cost of Mn in LiMnO$_2$, and the stable electrochemical characteristics of LiCoO$_2$.

For example, the composite cathode active material may be 0.55Li$_2$MnO$_3$·0.425 Li[Ni$_{0.4}$Co$_{0.2}$Mn$_{0.4}$]O$_2$·0.025LiMn$_2$O$_4$, 0.55Li$_2$MnO$_3$·0.4Li[Ni$_{0.4}$Co$_{0.2}$Mn$_{0.4}$]O$_2$·0.05LiMn$_2$O$_4$, or 0.55Li$_2$MnO$_3$·0.35Li[Ni$_{0.4}$Co$_{0.2}$Mn$_{0.4}$]O$_2$·0.01LiMn$_2$O$_4$, but is not limited thereto.

The composite cathode active material may comprise particles with an average diameter from about 10 nanometers (nm) to about 500 μm, or about 20 nm to about 100 μm, or about 1 μm to about 30 μm. A lithium secondary battery with improved properties can be manufactured when the average diameter of particles of the composite cathode active material is in the above range.

The composite cathode active material may be prepared by a method comprising: combining manganese sulfate and a sulfate of the metal or the metalloid to form a mixture; dissolving the mixture in water to form a solution; contacting the solution with a precipitator to form a precipitate; adding lithium carbonate to the precipitate to form a second mixture; and heat treating the second precipitate to manufacture the composite cathode active material. The precipitator may be a hydroxide, such as an alkali metal or alkaline earth metal hydroxide. NaOH is mentioned. The method may further comprise adding a chelating agent with the precipitator. The chelating agent may be an ammonium compound such as ammonium hydroxide, for example. The solution may be allowed to stand or be stirred for 1 to 10 hours at 20° C. to 100° C. to form the precipitate. The precipitate may be dried, e.g., at 50° C. to 150° C. before adding the lithium carbonate. The heat treating may be conducted at 500° C. to 1200° C., or 600° C. to 1100° C. in air for 1 to 30 hours, or 2 to 20 hours.

According to another embodiment, a cathode of the lithium secondary battery includes the composite cathode active material.

The cathode of the lithium secondary battery may be prepared, for example, as follows. A cathode active material composition may be prepared by combining the composite cathode active material, a conductive material, a binder, and a solvent. A cathode electrode plate whereon a cathode active material is disposed may be prepared by directly coating the cathode active material composition on an aluminum current collector followed by drying. Alternatively, a cathode electrode plate whereon a cathode active material is formed may be prepared by casting the cathode active material composition on a separate support, and laminating a film obtained by detaching from the support on the aluminum current collector.

The conductive material to be used may comprise, though is not limited thereto, at least one selected from carbon black, graphite granules, natural graphite, artificial graphite, acetylene black, Ketjen black, carbon fiber, and carbon nanotube; a metal powder or metal fiber or metal tube comprising at least one selected from copper, nickel, aluminum, and silver; a conductive polymer such as a polyphenylene derivative, and any other suitable conductive material used in the art. A combination comprising at least one of the foregoing may be used.

The binder may include, though not limited thereto, at least one selected from vinylidene fluoride/hexafluoropropylene copolymer, polyvinylidene fluoride, polyacrylonitrile, polymethylmethacrylate, a polytetrafluoroethylene ("PTFE"), styrene butadiene rubber-based polymer, and any suitable binder used in the art.

The solvent may include, though not limited thereto, at least one selected from N-methylpyrrolidone ("NMP"), acetone, water, and any suitable binder used in the art.

If desired, a thermoplastic agent may be further added to the cathode active material composition, for example to form pores inside the electrode plate.

The amount of the composite cathode active material, the conductive material, the binder, and the solvent may be at a level used in the art of lithium batteries. At least one of the conductive material, the binder, and the solvent may be omitted if desired, for example depending on the use and constitution of the lithium secondary battery. A content of the composite cathode active material, the conductive material, the binder, and the solvent may be determined by one of skill in the art without experimentation.

According to another embodiment, the lithium secondary battery includes a cathode including the composite cathode active material. The lithium secondary battery may be manufactured using the following method.

First, a cathode is manufactured by the method described above.

Then, an anode may be manufactured as follows. The anode may be manufactured in the same manner as the cathode except that an anode active material is used instead of the composite cathode active material. In addition, the conductive material, the binder, and the solvent of the anode active material composition may be the same as those used for the manufacture of the cathode.

For example, the anode active material composition may be manufactured by combining an anode active material, a conductive material, and a solvent, and an anode electrode plate may be manufactured by directly coating the anode active material composition on a copper current collector. Alternatively, an anode electrode plate may be prepared by casting the anode active material composition on a separate support, and laminating the anode active material film detached from the support on the copper current collector.

The anode active material may be any suitable material which can insert and deinsert lithium. As used herein, insert and deinsert include intercalation and deintercalation and alloying and dealloying processes, respectively. The anode active material of the present disclosure may comprise any suitable anode active material used in the art of lithium secondary batteries, for example, at least one selected from lithium metal, a metal which can form an alloy with lithium, a transition metal oxide, a non-transition metal oxide, and a carbon-based material. The transition metal oxide, the non-transition metal oxide, and the carbon-based material may be materials which can intercalate and deintercalate lithium.

For example, the metal which can form an alloy may include at least one selected from Si, Sn, Al, Ge, Pb, Bi, Sb, a Si—Z alloy (wherein Z is at least one selected from an alkali metal, an alkali earth metal, a Group XIII element, a Group XIV element, a transition metal, and a rare earth element), and a Sn—Z alloy (wherein Z is at least one selected from an alkali metal, an alkali earth metal, a Group XIII element, a Group XIV element, a transition metal, and a rare earth element). Y may be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

For example, the anode active material may be a lithium titan oxide, a vanadium oxide, or a lithium vanadium oxide.

For example, the non-transition metal oxide may be $SnO_2$, or $SiO_x$ (wherein $0<x<2$).

For example, the carbon-based material may be at least one selected from a crystalline carbon, and an amorphous carbon.

The crystalline carbon may be amorphous, planar, or flaky, and the crystalline carbon may be at least one selected from a graphite such as spherical or fibrous natural graphite, and an artificial graphite. The amorphous crystalline carbon may be at least one selected from soft carbon (e.g., carbon calcined at low temperature), hard carbon, mesophase pitch carbide, and calcined coke.

The amounts of the anode active material, the conductive material, the binder, and the solvent may be at a level used in the art of lithium batteries and can be determined by one of skill in the art without undue experimentation.

Then, a separator to be inserted between the cathode and the anode can be prepared. The separator may be any suitable material that can be used in the art of lithium batteries. In particular, the separator having a low resistance to ionic migration of ions such as lithium ions while having excellent electrolyte containing capability may be used. For example, the separator may be at least one selected from glass fiber, polyester, Teflon, polyethylene, polypropylene, and polytetrafluoroethylene ("PTFE"), and may be a woven or nonwoven fabric. For example, in a lithium ion battery, a windable separator such as polyethylene or polypropylene can be used. For example, in a lithium ion polymer battery, a separator having excellent organic electrolyte impregnating capability may be used. For example, the separator may be manufactured according to a method described below.

A separator composition may be prepared by mixing a polymer resin, a filler, and a solvent. The separator may be formed by directly coating the separator composition on the upper part of an electrode followed by drying. Alternatively, a separator may be formed by casting the separator composition on a support, drying and laminating the separator composition film detached from the support on the upper part of the electrode.

The polymer resin for manufacturing the separator may not be particularly limited, and any suitable material used as a binder of an electrode plate may be used, and may be for example, at least one selected from a vinylidene fluoride/hexafluoropropylene copolymer, polyvinylidene fluoride "(PVDF")", polyacrylonitrile, and polymethylmethacrylate.

Then, an electrolyte can be prepared.

The electrolyte may be, for example, an organic electrolyte. Alternatively, the electrolyte may be a solid, for example, a boron oxide, or a lithium oxynitride, but is not limited thereto, and any suitable material that can be used as a solid electrolyte in the related art may be used. The solid electrolyte may be formed on the anode via a method such as sputtering.

The organic electrolyte may be manufactured by dissolving a lithium salt in an organic solvent.

The organic solvent of the present disclosure may be any suitable organic solvent used in the art, for example, at least one selected from propylene carbonate ("PC"), ethylene carbonate ("EC"), fluoroethylene carbonate ("FEC"), butylenes carbonate ("BC"), dimethyl carbonate ("DMC"), diethyl carbonate ("DEC"), methyl ethyl carbonate ("MEC"), methyl propyl carbonate ("MPC"), ethyl propyl carbonate ("EPC"), methyl isopropyl carbonate ("MIC"), dipropyl carbonate ("DPC"), dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethyl sulfoxide, dioxane, 1,2-dimethoxy ethane, sulforane, dichloroethane, chlorobenzene, nitrobenzene, diethylene glycol, and dimethyl ether.

The lithium salt may be any suitable lithium salt used in the art, and may be at least one selected from for example, $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_yF_{2y+1}SO_2)$ (wherein x and y are natural numbers), LiCl, and LiI.

FIG. 1 shows an exploded perspective view of an embodiment of a lithium secondary battery. Referring to FIG. 1, the lithium secondary battery includes a cathode 114, an anode 112, and a separator 113. The cathode 114, the anode 112, and the separator 113 can be as described above. The cathode 114, the anode 112, and the separator 113 can be either wound or folded to be accommodated in a battery container 120. Then, an organic electrolyte is introduced into the battery container 120 and sealed with a sealing member 140 to thereby form a lithium secondary battery 100. FIG. 1 illustrates a cylindrical battery, however, the lithium secondary battery of the present disclosure is not limited thereto, and a square-shaped battery or a pouch-shaped battery may also be formed.

Lithium secondary batteries may be classified as lithium ion batteries, lithium ion polymer batteries, and lithium polymer batteries depending on the type of the separator and the electrolyte used in the battery. Lithium secondary batteries may be also classified as cylindrical batteries, square-shaped batteries, a coin-shaped batteries, pouch-shaped batteries according to the shape thereof, and also bulk-type batteries and thin film-type batteries according to the size thereof. In an embodiment, the lithium secondary battery may not be particularly limited with regard to the shape thereof. Since the structure and manufacturing method of the lithium battery can be determined by one of skill in the art without undue experimentation, detailed explanations in this regard will not be further described herein.

The lithium secondary battery may be used in all kinds of devices which require high capacity and high output, for example, small electronic devices such as notebook computers and smart phones, electric bicycles, and electric tools. Since the lithium secondary battery has excellent lifetime characteristics and high rate capabilities, it can be used in an electric vehicle ("EV"), a hybrid electric vehicle ("HEV"), or a plug-in hybrid electric vehicle ("PHEV"). Furthermore, the lithium secondary battery may be used for applications where a large amount of power storage is desired, for example, in a power storage system which can store electricity generated by a renewable energy source such as solar, wind, or title tidal power.

In another embodiment, the method of manufacturing the composite cathode active material may be, for example, a co-precipitation method. In this case, a uniform composition may be obtained, and additionally, the composite cathode active material may be doped with sulfur derived, for example, from a metal sulfate. The metal sulfate may be of the formula $MSO_4$, wherein M is a metal or a metalloid, and can be at least one selected from Mn, V, Cr, Fe, Co, Ni, Zr, Re, Al, B, Ge, Ru, Sn, Ti, Nb, Mo, and Pt.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Example 1

(a) Manufacture of a Composite Cathode Active Material $0.55Li_2MnO_3 \cdot 0.425LiNi_{0.4}Co_{0.2}Mn_{0.4}O_2 \cdot 0.025LiMn_2O_4$ powder was synthesized via a co-precipitation method, wherein 0.01 mole % of oxygen was replaced with sulfur. The starting materials used were nickel sulfate, cobalt sulfate, and manganese sulfate. In order to obtain the composite cathode active material of the formula, $0.55Li_2MnO_3 \cdot 0.425LiNi_{0.4}Co_{0.2}Mn_{0.4}O_2 \cdot 0.025LiMn_2O_4$, the starting materials were mixed stoichiometrically. Then, the starting materials were dissolved in distilled water to obtain a mixed solution with a total concentration of 2 molar (M), and $NH_4OH$ as a chelating agent and NaOH as a precipitator were added thereto. After reacting the resultant for 4 hours at 60° C., the precipitated precursor, of the formula $(Ni_{0.166}Co_{0.083}Mn_{0.751})(OH)_2$ with sulfur doped thereon, was dried at 100° C., and mixed in a quantitative ratio with lithium carbonate ($Li_2CO_3$), subjected to heat treatment, and finally a $0.55Li_2MnO_3 \cdot 0.425LiNi_{0.4}Co_{0.2}Mn_{0.4}O_2 \cdot 0.025LiMn_2O_4$ powder was obtained with sulfur doped therein. In particular, the heat treatment was performed at 900° C. for 10 hours while releasing air.

(b) Manufacture of a Cathode

The composite cathode active material synthesized in (a), a carbon conductive material, and a binder were mixed in a weight ratio of 90:5:5 (composite cathode active material: carbon conductive material:binder), and then NMP was evenly mixed with the mixed solid (the composite cathode active material+the carbon conductive material+the binder) in a weight ratio of 45:55 (NMP:mixed solid), to prepare a slurry. In particular, Denka Black®, i.e., a carbon black, was used as the carbon conductive material, and polyvinyl difluoride ("PVDF") was used as the binder. Then, the slurry was coated as a thick layer on an aluminum foil, and then dried to form a cathode electrode plate. Thus, a resultant cathode electrode plate was dried again to remove all remaining solvent and moisture.

(c) Manufacture of a Lithium Secondary Battery

An electrochemical cell (lithium secondary battery) was manufactured in order to conduct a charge/discharge experiment. A lithium foil was used as a counter electrode. Regarding the electrolyte, a solution in which 1.3 M $LiPF_6$ was dissolved in a mixed solvent of FEC/DMC in a volume ratio of 35/65 was used.

Example 2

A composite cathode active material, a cathode, and a lithium secondary battery were manufactured in the same manner as in Example 1, except that the stoichiometry of the starting materials in Example 1(a) was changed so that a $0.55Li_2MnO_3 \cdot 0.4LiNi_{0.4}Co_{0.2}Mn_{0.4}O_2 \cdot 0.05LiMn_2O_4$ powder was synthesized, wherein 0.01 mole % of oxygen was replaced with sulfur.

Example 3

A composite cathode active material, a cathode, and a lithium secondary battery were manufactured in the same manner as in Example 1, except that, the stoichiometry of the starting materials in Example 1(a) was changed so that a $0.55Li_2MnO_3 \cdot 0.35LiNi_{0.4}Co_{0.2}Mn_{0.4}O_2 \cdot 0.1LiMn_2O_4$ powder was synthesized, wherein 0.01 mole % of oxygen was replaced with sulfur.

Comparative Example

A composite cathode active material, a cathode, and a lithium secondary battery were manufactured in the same manner as in Example 1, except that the stoichiometry of the starting materials in Example 1(a) was changed so that a $0.55Li_2MnO_3 \cdot 0.45LiNi_{0.4}Co_{0.2}Mn_{0.4}O_2$ oxide was synthesized, wherein 0.01 mole % of oxygen was replaced with sulfur.

Evaluation of Charge/Discharge Characteristics

A first charge/discharge, a second charge/discharge, and a cycle charge/discharge were performed for the lithium secondary batteries prepared in Examples 1 to 3 and Comparative Example at room temperature of 25° C.

(a) First Charge/Discharge

The lithium secondary batteries prepared in Examples 1 to 3 and Comparative Example were charged with a constant current of 0.1 C up to 4.7 V and then discharged with a constant current of 0.1 C up to 2.5 V. FIGS. 2 to 5 respectively show a graph of the first charge and discharge in the lithium secondary batteries prepared in Examples 1 to 3 and in the Comparative Example. Referring to FIGS. 2 to 5, and while not wanting to be bound by theory, it is understood that the flat portion at 4.5 V of the charging curve indicates the activation of $Li_2MnO_3$ phase. In addition, the concave portion in the discharging curve in the graph for Example 3 in FIG. 5 indicates the presence of a spinel phase. $LiMn_2O_4$ phase is not clearly shown in FIGS. 3 and 4, but the spinel phase is present in the lithium secondary batteries prepared in Examples 1 and 2.

(b) Second Charge/Discharge

A first set of the lithium secondary batteries prepared in Examples 1 to 3 and Comparative Example which underwent the first charge/discharge were charged with a constant current of 0.5 C up to 4.6 V, and then charged further with a constant voltage of 4.6 V up to a current of 0.05 C. Then, the lithium secondary batteries were discharged with a constant current of 0.2 C up to 2.5 V. A second set of the lithium secondary batteries prepared in Examples 1 to 3 and Comparative Example which underwent the first charge/discharge were charged with a constant current of 0.5 C up to 4.6 V, and then charged further with a constant voltage of 4.6 V up to a current of 0.05 C. Then, the lithium secondary batteries were discharged with a constant current of 1 C up to 2.5 V. A third set of the lithium secondary batteries prepared in Examples 1 to 3 and Comparative Example which underwent the first charge/discharge were charged with a constant current of 0.5 C up to 4.6 V, and then charged further with a constant voltage of 4.6 V up to a current of 0.05 C. Then, the lithium secondary batteries were discharged with a constant current of 2 C up to 2.5 V.

(c) Cycle Charge/Discharge

The lithium secondary batteries prepared in Examples 1 to 3 and Comparative Example which underwent the first charge/discharge and the second charge/discharge (the second set) were charged with a constant current of 1 C up to 4.6 V, and then discharged with a constant current of 1 C up to 2.5 V. The charge/discharge cycle was repeated 50 times.

The charge/discharge rate capacity and the initial charge/discharge efficiency of the lithium secondary batteries prepared in Examples 1 to 3 and the Comparative Example at the first charge/discharge are shown in Table 1 below. The efficiency of the first charge/discharge can be obtained by Equation 1 below.

First charge/discharge efficiency(%)=[Discharging capacity at the first charge/discharge]/[Charging capacity at the first charge/discharge]×100     Equation 1

Referring to Table 1, the first charge/discharge efficiency of Example 1, wherein the mole ratio of $LiMn_2O_4$ spinel phase is 2.5%, was the highest, whereas the first charge/discharge efficiency of Example 3, wherein the mole ratio of $LiMn_2O_4$ spinel phase is 10%, was the lowest.

TABLE 1

|  | 0.1 C Charge (mAh/g) | 0.1 C Discharge (mAh/g) | First charge/discharge efficiency (%) |
|---|---|---|---|
| Comparative Example | 345 | 277 | 80.2% |
| Example 1 | 341 | 276 | 81.0% |
| Example 2 | 330 | 265 | 80.3% |
| Example 3 | 267 | 204 | 76.4% |

Figure 6:
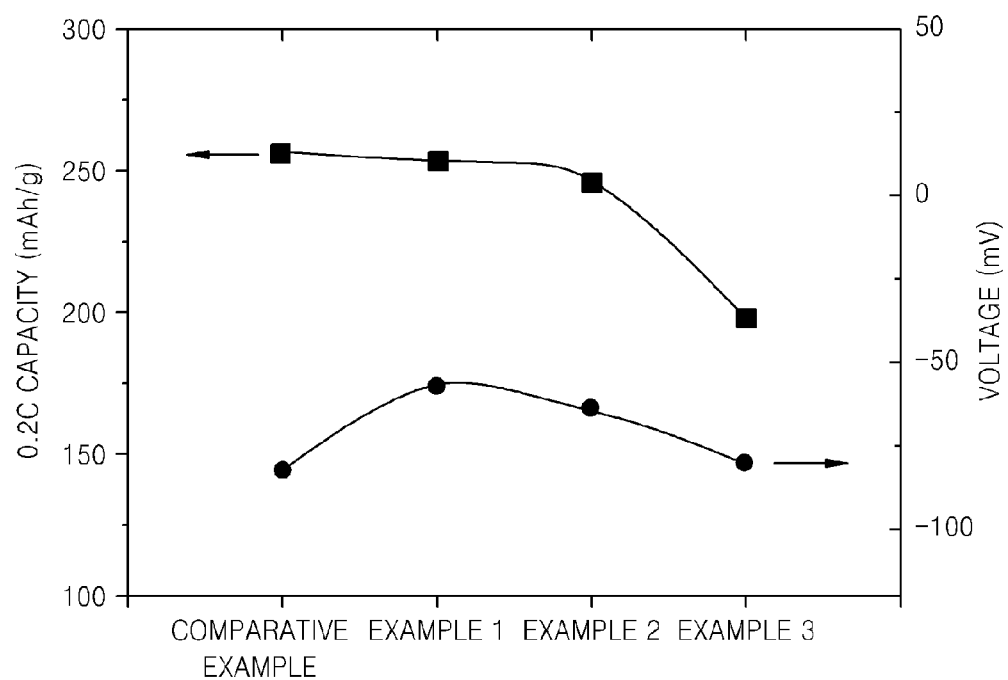
FIG. 6 is a graph of capacity (milliampere-hours per gram) and voltage (millivolts, mV) for Examples 1 to 3 and the Comparative Example showing a discharge capacity ratio (%) in a second charge and discharge of a lithium secondary battery.

In Table 2 and FIG. 6, the discharge capacity ratio, i.e., (the discharge capacity when discharged with a constant current of 2 C)/(the discharge capacity when discharged with a constant current of 0.2 C) in the second charge/discharge of the lithium secondary batteries prepared in Examples 1 to 3 and Comparative Example were compared. The ratio represents the amount of energy that can be discharged at a high rate as compared to that at a low rate, to provide a rate capability characteristic. Referring to Table 2 and FIG. 6, the discharge capacity ratio became higher in the order of Example 3, Example 2, and Example 1, i.e., as the molar ratio in $LiMn_2O_4$ spinel phase increased, thereby exhibiting improved high rate characteristics.

TABLE 2

|  | 0.2 C Discharge (mAh/g) | 2 C Discharge capacity (mAh/g) | 2 C vs. 0.2 C Discharge capacity ratio (%) |
|---|---|---|---|
| Comparative Example | 256 | 216 | 84.2% |
| Example1 | 253 | 195 | 76.9% |
| Example2 | 246 | 198 | 80.3% |
| Example3 | 198 | 168 | 84.8% |

The cycle capacity maintenance rate and the voltage reduction upon cycle charge/discharge of the lithium secondary batteries are shown in Table 3. The capacity maintenance rate was obtained via Equation 2, and the voltage reduction was obtained by Equation 3.

cycle capacity maintenance rate(%)=[Discharging capacity at $50^{th}$ cycle]/[Discharging capacity at $1^{st}$ cycle]×100     Equation 2

Voltage reduction=[average discharging voltage of the $50^{th}$ cycle]−[average discharging voltage of $1^{st}$ cycle]     Equation 3

Referring to Table 3, the cycle capacity maintenance rate was higher and also the portion of voltage reduction became larger in the order of Example 3, Example 2, and Example 1, i.e., as the molar ratio in $LiMn_2O_4$ spinel phase increased. Furthermore, since the cycle capacity maintenance rate of Examples 1 to 3 was all higher than that of Comparative Example, and thus, it was confirmed that the lithium secondary batteries of Examples have excellent lifetime characteristics than that of the Comparative Example.

TABLE 3

|  | cycle capacity maintenance rate (%) | average discharging voltage per cycle (V) | average discharging voltage of 50 cycles (V) | Voltage reduction (mV) |
|---|---|---|---|---|
| Comparative Example | 84.5 | 3.526 | 3.443 | −83 |
| Example 1 | 84.7 | 3.485 | 3.428 | −57 |
| Example 2 | 86.1 | 3.487 | 3.423 | −64 |
| Example 3 | 86.7 | 3.421 | 3.341 | −80 |

It should be understood that the exemplary embodiments described therein should be considered in a descriptive sense only and not for purposes of limitation. Descriptions of features, advantages, or aspects within each embodiment shall be available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising:
a lithium metal oxide comprising an oxide of Formula 1 and sulfur, $$x\text{Li}_2\text{MnO}_3 \cdot (1-x-y)\text{LiMO}_2 \cdot y\text{LiMn}_2\text{O}_4 \quad (1)$$

wherein $0<x<0.6$, $0<y<0.1$, and M is at least one selected from a metal and a metalloid, and
wherein the sulfur partially replaces oxygen in a structure of the lithium metal oxide.

2. The composite cathode active material according to claim 1, wherein $0<y<0.05$.

3. The composite cathode active material according to claim 1, wherein $0.3<x<0.6$ and $0.01<y<0.05$.

4. The composite cathode active material according to claim 1, wherein a molar ratio between oxygen and sulfur included in the lithium metal oxide is $O:S=2-\beta:\beta$, wherein $0<\beta<0.1$.

5. The composite cathode active material according to claim 1, wherein the $\text{Li}_2\text{MnO}_3$ and the $\text{LiMO}_2$ each have a layered structure.

6. The composite cathode active material according to claim 1, wherein the $\text{LiMn}_2\text{O}_4$ has a spinel structure.

7. The composite cathode active material according to claim 1, wherein M is at least one selected from Mn, V, Cr, Fe, Co, Ni, Zr, Re, Al, B, Ge, Ru, Sn, Ti, Nb, Mo, and Pt.

8. The composite cathode active material according to claim 1, wherein M comprises Co, Ni, and Mn.

9. A composite cathode active material comprising:
a lithium metal oxide comprising an oxide of Formula 2 and sulfur, $$x'\text{Li}_2\text{MnO}_3 \cdot (1-x'-y')\text{Li}[\text{Ni}_a\text{Co}_b\text{Mn}_c]\text{O}_2 \cdot y'\text{LiMn}_2\text{O}_4 \quad (2),$$

wherein $0.4<x'<0.6$, $0.01<y'<0.05$, and $a+b+c=1$, and
wherein a molar ratio between oxygen and sulfur included in the lithium metal oxide is $O:S=2-\beta:\beta$, wherein $0<\beta<0.1$.

10. A cathode comprising the composite cathode active material according to claim 1.

11. A lithium secondary battery comprising:
a cathode comprising a lithium metal oxide comprising an oxide of Formula 1 and sulfur, $$x\text{Li}_2\text{MnO}_3 \cdot (1-x-y)\text{LiMO}_2 \cdot y\text{LiMn}_2\text{O}_4 \quad (1),$$

wherein $0<x<0.6$ and $0<y<0.1$, and M is at least one selected from a metal and a metalloid, and
wherein the sulfur partially replaces oxygen in a structure of the lithium metal oxide;
an anode comprising an anode active material capable of insertion and deinsertion of lithium; and
an electrolyte between the cathode and the anode, the electrolyte comprising a lithium salt and a non-aqueous organic solvent.

12. The lithium secondary battery according to claim 11, wherein $0.3<x<0.6$ and $0.01<y<0.05$.

13. The lithium secondary battery according to claim 11, wherein a molar ratio between oxygen and sulfur included in the lithium metal oxide is $O:S=2-\beta:\beta$, wherein $0<\beta<0.1$.

14. The lithium secondary battery according to claim 11, wherein the oxide is expressed by Formula 2, $$x'\text{Li}_2\text{MnO}_3 \cdot (1-x'-y')\text{Li}[\text{Ni}_a\text{Co}_b\text{Mn}_c]\text{O}_2 \cdot y'\text{LiMn}_2\text{O}_4 \quad (2),$$

wherein $0.4<x'<0.6$, $0.01<y'<0.05$, and $a+b+c=1$, and
wherein a molar ratio between oxygen and sulfur included in the lithium metal oxide is $O:S=2-\beta':\beta'$, wherein $0<\beta'<0.1$.

15. The lithium secondary battery according to claim 11, wherein M in Formula 1 is at least one selected from Mn, V, Cr, Fe, Co, Ni, Zr, Re, Al, B, Ge, Ru, Sn, Ti, Nb, Mo, and Pt.

16. The lithium secondary battery according to claim 11, wherein M in Formula 1 comprises Co, Ni, and Mn.

17. The lithium secondary battery according to claim 11, wherein the anode active material comprises at least one selected from a vanadium oxide, a lithium vanadium oxide, Si, $\text{SiO}_x$ wherein $0<x<2$, a Si—Z alloy wherein Z is at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po, graphite, soft carbon, hard carbon, mesophase pitch carbide, and calcined coke.

18. The lithium secondary battery according to claim 11, wherein the lithium salt comprises at least one selected from $\text{LiPF}_6$, $\text{LiBF}_4$, $\text{LiSbF}_6$, $\text{LiAsF}_6$, $\text{LiCF}_3\text{SO}_3$, $\text{Li(CF}_3\text{SO}_2)_3\text{C}$, $\text{Li(CF}_3\text{SO}_2)_2\text{N}$, $\text{LiC}_4\text{F}_9\text{SO}_3$, $\text{LiClO}_4$, $\text{LiAlO}_4$, $\text{LiAlCl}_4$, $\text{LiBPh}_4$, $\text{LiN(C}_x\text{F}_{2x+1}\text{SO}_2)(\text{C}_x\text{F}_{2y+1}\text{SO}_2)$ wherein x and y are natural numbers, LiCl, LiI, and lithium bisoxalato borate.

19. The lithium secondary battery according to claim 11, further comprising a separator between the cathode and the anode, wherein the separator electrically insulates the cathode from the anode.

20. A method of manufacturing the composite cathode active material according to claim 1, the method comprising:
combining manganese sulfate and a sulfate of a metal or a metalloid to form a mixture;
dissolving the mixture in water to form a solution;
contacting the solution with a precipitator to form a precipitate;
adding lithium carbonate to the precipitate to form a second mixture; and
heat treating the second precipitate to manufacture the composite cathode active material.

* * * * *